United States Patent [19]

Long

[11] Patent Number: 5,535,130
[45] Date of Patent: Jul. 9, 1996

[54] SYNCHRONIZATION OF PRERECORDED AUDIO/VIDEO SIGNALS WITH MULTI-MEDIA CONTROLLERS

[75] Inventor: Joseph D. Long, Greensboro, N.C.

[73] Assignee: Gilbarco Inc., Greensboro, N.C.

[21] Appl. No.: 406,542

[22] Filed: Mar. 20, 1995

Related U.S. Application Data

[62] Division of Ser. No. 959,844, Oct. 13, 1992.

[51] Int. Cl.$^6$ .................................................. G06F 17/60
[52] U.S. Cl. ........................................ 364/479; 364/465
[58] Field of Search .................................... 364/465, 479, 364/188, 189; 369/69, 70; 360/79, 80; 222/23, 39, 52

[56] References Cited

U.S. PATENT DOCUMENTS

| | | |
|---|---|---|
| 3,732,365 | 5/1973 | Rando et al. . |
| 4,086,005 | 4/1978 | Honebrink et al. . |
| 4,216,492 | 8/1980 | Schmalz . |
| 4,660,153 | 4/1987 | Yamashita et al. ........................ 364/465 |
| 4,750,130 | 6/1988 | Shimamura et al. ...................... 364/465 |
| 4,837,638 | 6/1989 | Fullwood . |
| 4,855,827 | 8/1989 | Best . |
| 4,995,026 | 2/1991 | Makabe et al. ............................ 369/70 |
| 5,008,749 | 4/1991 | Ruckert . |
| 5,019,905 | 5/1991 | Pshtissky . |
| 5,027,282 | 6/1991 | Hollidge .................................. 364/479 |
| 5,097,348 | 3/1992 | Suetaka . |
| 5,140,420 | 8/1992 | Hurst . |
| 5,216,500 | 6/1993 | Krummey et al. . |

FOREIGN PATENT DOCUMENTS

| | | |
|---|---|---|
| 617588 | 11/1991 | Australia . |
| 0212359 | 3/1987 | European Pat. Off. .................. 369/70 |
| 0493881A2 | 7/1991 | European Pat. Off. . |
| 0532277A2 | 3/1993 | European Pat. Off. . |
| 2060312 | 4/1981 | United Kingdom . |
| WO92/15175 | 9/1992 | WIPO . |

Primary Examiner—Roy N. Envall, Jr.
Assistant Examiner—Steven R. Garland
Attorney, Agent, or Firm—Rhodes Coats & Bennett

[57] ABSTRACT

A fuel dispenser having a controllable audio/video program display includes a fuel pump and delivery path, a program media display, and a prerecorded program and a multi-media controller to direct program signals to the program media display. Apparatus is included for recovering multi-media control signals embedded in the program signals in the prerecorded program including a detector for detecting predetermined portions of the program signals having embedded control signals and rerouting means for rerouting the control signals in the program signals to an output. The multi-media controller is coupled to the rerouting means to act on the program signals as directed to the media display.

19 Claims, 5 Drawing Sheets

SYNCHRONIZATION OF PRERECORDED AUDIO/VIDEO SIGNALS WITH MULTI-MEDIA CONTROLLERS

This application is a division of application Ser. No. 07/959,844, filed Oct. 13, 1992.

BACKGROUND OF THE INVENTION

The present invention relates to improvements in multi-media systems and displays, typically including audio and visual components.

Multi-media systems are known as devices able to present information from a variety of information sources, such as computer displays, video displays, synthesized music, prerecorded audio, etc., in a synchronized manner. One of the general decisions to be made in multi-media development is how to coordinate the various information sources in order to form a coherent, and aesthetically pleasing format. Typical prior art multi-media systems control and coordinate their various inputs using a computer program. The computer, then, is in charge of "making decisions" as to what is to be included in a display. But, when the visual or audio programming to be played is recorded on a tape or video disk, the computer does not have data concerning the recording unless it is separately supplied to the computer as another database or the like. This adds to the cost and complexity of the system, since the separate database must be created and manipulated. Accordingly, there is a need in the art for a multi-media control apparatus and methodology for controlling various inputs other than by a computer control.

SUMMARY OF THE INVENTION

The present invention fulfills this need in the art by providing an apparatus for encoding multi-media control signals in an audio/video program including detector means for detecting predetermined portions of the program signals and substitution means for substituting multi-media control signals into the program signals in place of the predetermined portions of the program signals.

According to one aspect, the detector means may be a synchronization separator to separate start-of-frame signals from the video signals and the substitution means may be a switching means for switching the control signals into the video signals after a start-of-frame signal is detected. The synchronization separator may also separate horizontal synchronization signals from the video signal and the switching means may stop switching the control signals into the video signals when a horizontal synchronization signal is detected. The substitution may take place immediately upon detection of the start-of-frame signal, or after a predetermined delay, and may continue until either the first or a subsequent horizontal synchronization signal, as desired.

According to a preferred embodiment, the switching means includes a latch having the start of frame input from the synchronization separator as one of a set and reset input and the horizontal synchronization signal as the other of a set and reset input and a switch having a signal routing controlled by the latch, whereby the switching means stops switching the control signals into the video signals when a horizontal synchronization signal is detected.

The apparatus preferably includes a control signal synchronizer to synchronize the control signals with the video signal upon detection of the start-of-frame signal.

This aspect of the invention is particularly useful if the video signal is a composite video signal.

The apparatus may include a video cassette recorder (or other recording device) coupled to the substitution means for recording the combined multi-media control signals and video signals.

The invention also provides a method of encoding multi-media control signals into program signals in an audio/video program including detecting predetermined portions of the program signals and substituting multi-media control signals into the program signals in place of the predetermined program signals.

The detecting step may separate start-of-frame signals from the video signals and the substituting step may switch the control signals into the video signals after a start-of-frame signal is detected. Preferably, the separating step includes separating a horizontal synchronization signal from the video signal and the switching step terminates when a horizontal synchronization signal is detected. The method preferably further includes synchronizing the control signals with the video signal upon detection of the start-of-frame signal.

According to a preferred embodiment the separating step also separates a horizontal synchronization signal from the video signal. The switching step may include one of setting a latch or resetting a latch when a start of frame is detected in the detecting step to output a signal level from the latch and the other of setting or resetting the latch when a horizontal synchronization signal is detected in the detecting step to halt outputting the signal level and routing the multi-media control signals to a common output when the latch outputs the signal level and routing the video signal to the common output when the latch does not output the signal level.

The method may include recording the combined multi-media control signals and video signals on a video cassette recorder.

According to another aspect, the invention provides an apparatus for recovering multi-media control signals embedded in video signals in a video program. This apparatus includes a detector means for detecting portions of the video signals having embedded control signals and rerouting means for rerouting the control signals in the video signals to an output adapted for attachment to a multi-media controller to act on the video signals as directed to a media display.

The detector means may be a synchronization separator to separate start-of-frame signals from the video signals and the rerouting means may be a gate for routing the control signals to the output when a start-of-frame signal is detected. Preferably, the synchronization separator also separates a horizontal synchronization signal from the video signal and the gate stops routing the control signals to the output when a horizontal synchronization signal is detected. The rerouting may take place immediately upon detection of the start-of-frame signal, or after a predetermined delay, and may continue until either the first or a subsequent horizontal synchronization signal, as desired.

This technique is particularly useful if the video signal is a composite video signal.

The apparatus preferably further includes a multi-media controller having the output as a first input and the video signals as a second input and control means for controlling the output of video signals from the multi-media controller in response to the control signals.

According to another aspect, the invention provides a method for recovering multi-media control signals embedded in video signals in a video program. The method includes detecting portions of the video signals having embedded control signals and rerouting the control signals in the video signals to an output adapted for attachment to a multi-media controller to act on the video signals as directed to a media display. Preferably, the detecting step includes separating start-of-frame signals from the video signals and the rerouting step includes gating the control signals to the output after a start-of-frame signal is detected. Preferably, the method further includes separating a horizontal synchronization signal from the video signal and terminating the rerouting when a horizontal synchronization signal is detected.

In a preferred embodiment the method further includes providing a multi-media controller having the control signals as a first input and video signals as a second input and controlling the output of video signals from the multi-media controller in response to the control signals.

According to another aspect, the invention provides an apparatus for encoding multi-media control signals into audio signals in a program. This apparatus includes a control signal modulator for modulating the control signals to a bandwidth of an audio signal, a filter for the audio signals to delete portions of the audio signals in the bandwidth, and a summing circuit to sum the modulated control signal and the filtered audio signal to form a combined control and audio signal. Typically, the audio signal has a bandwidth and the bandwidth in which the control signals are modulated is an upper part of the audio bandwidth.

The control signal modulator may modulate the control signals in a modulation mode selected from the group consisting of frequency modulation, amplitude modulation and pulse modulation.

The apparatus may include a recorder to record the combined control and audio signals.

According to another aspect, the invention provides a method for encoding multi-media control signals into audio signals in a program. The method includes modulating the control signals to a bandwidth of the audio signal, filtering the audio signals to delete portions of the audio signals in the bandwidth, and summing the modulated control signal and the filtered audio signal to form a combined control and audio signal.

Typically, the audio signal has a limited bandwidth, and the bandwidth in which the control signals are modulated is an upper part of the audio bandwidth. The modulating step may include modulating the control signals in a modulation mode selected from the group consisting of frequency modulation, amplitude modulation and pulse modulation. The method preferably includes recording the combined control and audio signals.

The invention also provides an apparatus for recovering multi-media control signals embedded in audio signal in a video program. This apparatus includes a T connection for providing the audio signals with embedded control signals along two paths, a low pass filter in one path and a high pass filter in the other path, the filters having outputs. One output directs an audio program having filtered-out control signals to an audio channel, and the other output directs a control signal having a filtered-out audio program to a multi-media controller channel.

Typically, the output of the high pass filter directs control signals to the multi-media controller channel.

In a preferred embodiment the apparatus further includes a multi-media controller having the output with the control signal as a first input and video signals as a second input and having control means for controlling the output of video signals from the multi-media controller in response to the control signals.

According to yet another aspect, the invention provides a method for recovering multi-media control signals embedded in audio signals in a program. This method includes communicating the combined audio signals with embedded control signals along two paths, low pass filtering the combined signals in one path and high pass filtering the combined signals in the other path to obtain an audio program having filtered-out control signals and a control signal having a filtered-out audio program, directing the audio program having filtered-out control signals to an audio channel, and directing the control signal having a filtered-out audio program to a multi-media controller channel. Preferably, the high pass filtering step provides the control signals with filtered-out audio program to be directed to the multi-media controller channel. The method preferably includes providing a multi-media controller having the output with the control signal as a first input and video signals as a second input and controlling the output of video signals from the multi-media controller in response to the control signals.

BRIEF DESCRIPTION OF THE DRAWINGS

The invention will be better understood after a reading of the Detailed Description of the Preferred Embodiments and a review of the drawings in which.

DETAILED DESCRIPTION OF THE PREFERRED EMBODIMENTS

This invention can be used in any audio/video reproduction system in which it is desirable to allow a prerecorded audio/visual program to simultaneously convey control information to the reproduction mechanism along with the recorded information. The control information may contain the information required to synchronize multiple, independent media sources. The information is used by a multi-media controller, which manipulates audio and/or video outputs based upon prerecorded or interactive controls, typically multi-media control signals. Thus, the audio component's volume or other characteristics could be varied, or the visual image could be faded out, windowed, or otherwise manipulated. Many other manipulations can also be included, as will be apparent to those of ordinary skill in the art. This invention is independent of the audio/video format because the control information can be encoded either in the audio or video portion of the program. Further, the audio encoding method allows the use of commercial, standard recording and playback equipment, easing reproduction problems.

Figure 5:
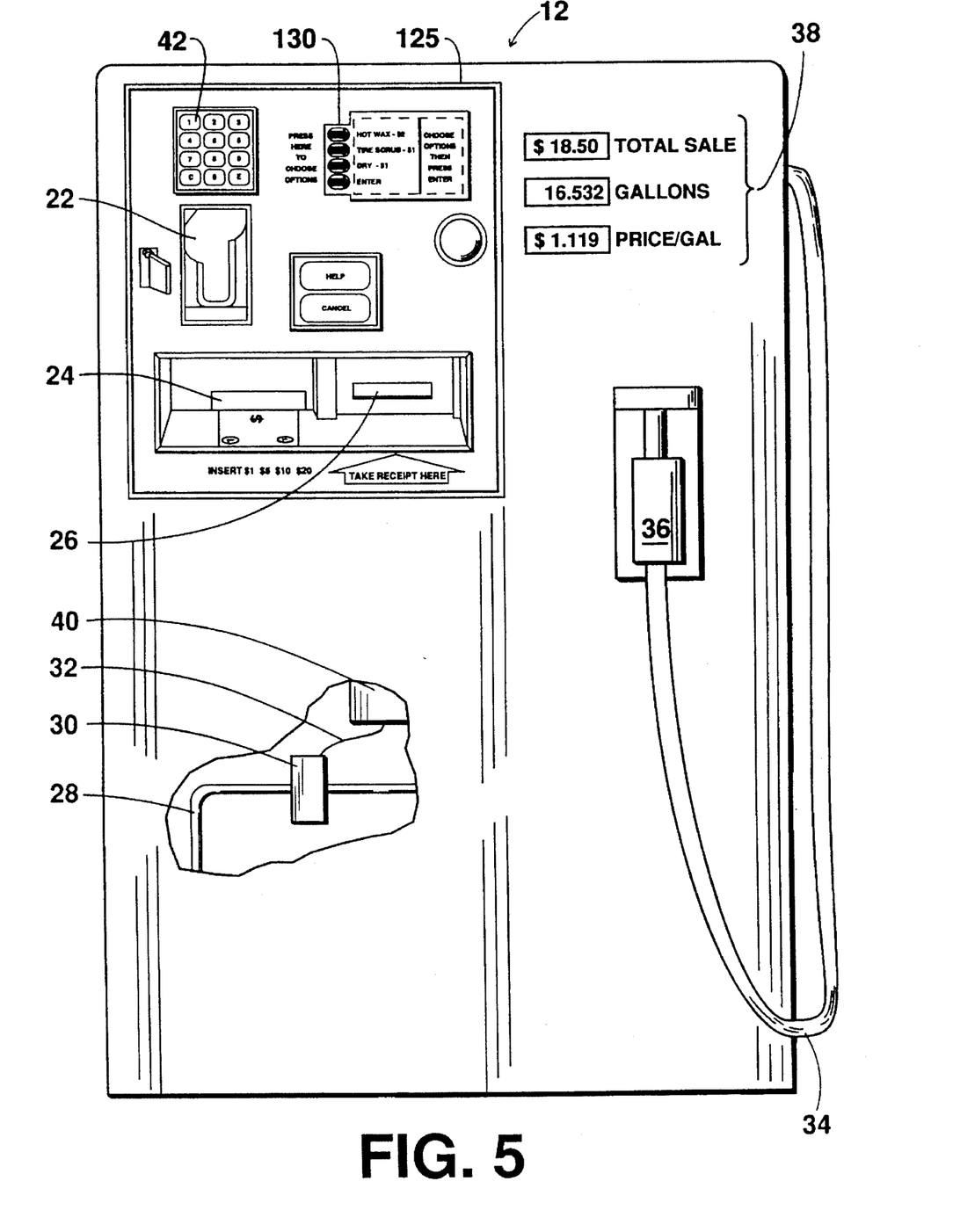
FIG. 5 is an elevation view, partially broken away of a fuel dispenser according to the invention.

As seen in FIG. 5, a fuel dispenser housing 12 is provided with conventional fuel supply line 28, metering device 30, outlet hose 34 and nozzle 36. The metering device 30 communicates data about the volume of fuel dispensed along line 32 to a transaction computer 40, which displays transaction information on displays 38. Dispenser 12 also includes a video display screen 125, preferably an active LCD display, with an adjacent keypad 130, which permits a customer to respond to inquiries from the transaction computer 40 by depressing a key. The apparatus also includes keypad 42 card reader 22, cash acceptor 24 and receipt discharge 26. The present invention enhances the displays available to be shown on the screen 125, by providing the ability to embed multi-media control signals on a recording to be played on the screen 125. The apparatus permits the control signals to be recovered to enable a multi-media controller to enhance the display to the customer. Two specific examples of ways to embed and recover the control signals will now be described:

Video Encoding

Should the format consist of composite video (which does not include an audio signal), the control information can be embedded an unused horizontal line of a video frame, which contains no displayed information. Additional circuitry detects the control information and passes the information on to the multi-media controller of the reproduction mechanism, which then acts upon that information to switch various signal sources in and out, or otherwise perform as directed in the control information.

Figure 1:
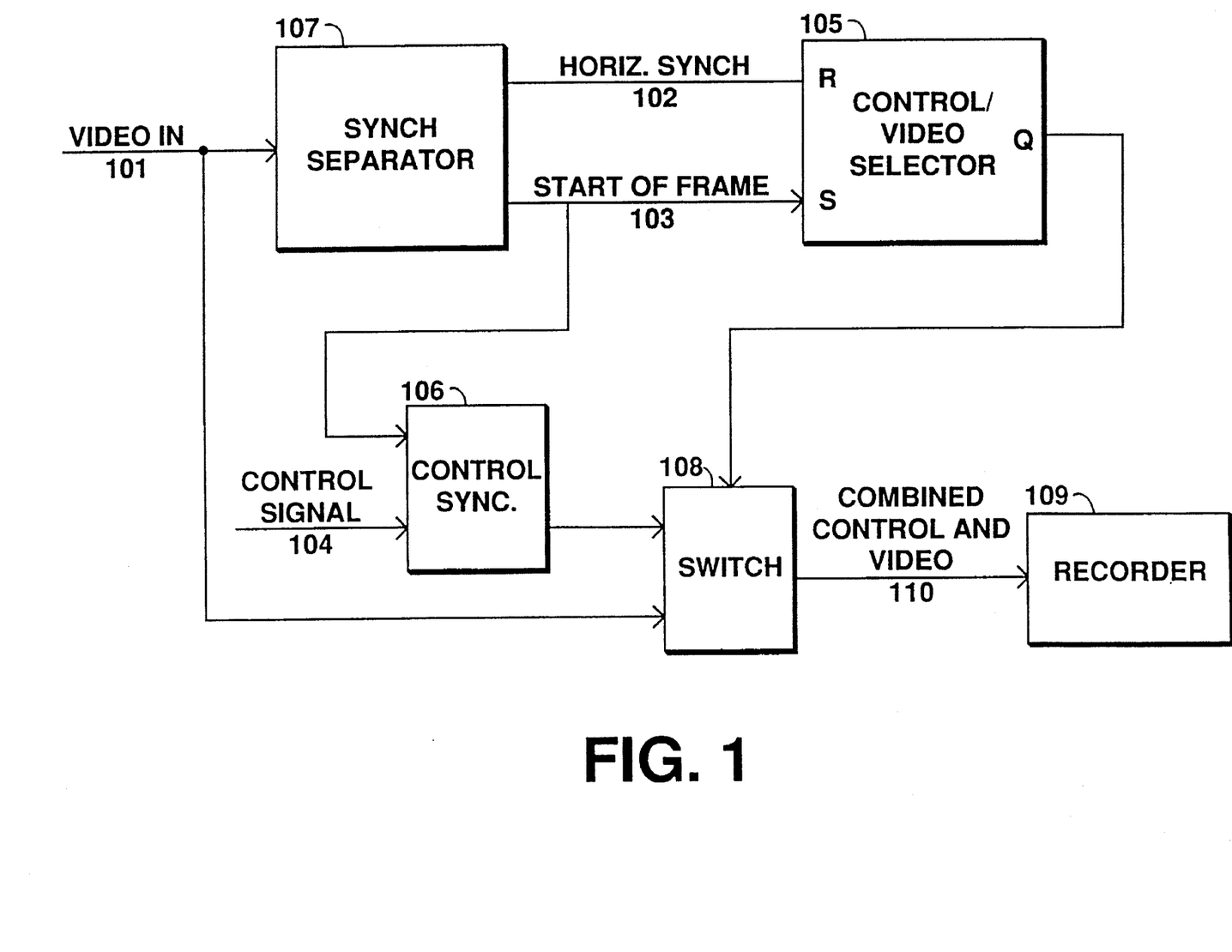
FIG. 1 is a functional block diagram of components for encoding audio/video signals with multi-media controller signals according to a first embodiment of the invention.

A block diagram of a circuit to encode the control information in the video signal is shown in FIG. 1. For this example, the control information is embedded in the first horizontal line of an interlaced composite video signal. The original video program 101 is directed into a sync separator circuit 107 designed to detect the horizontal sync pulse 102, and a start of first frame signal 103. The start of first frame signal causes the normal video signal to be switched out by RS latch 105 and switch 108 and is replaced with the control information 104. The start of frame signal inputs a signal to set the latch to output a Q value from the latch. The horizontal synch signal resets the latch to halt outputting the Q value. The Q value is applied to the switch 108, which acts to route the multi-media control signals to a common output when the latch outputs the Q value. The switch routes the video signal to the common output when the latch does not output the Q value. Of course, the reverse latch arrangement in which the start-of-frame signal is a reset and the horizontal synch signal is the set can readily, be implemented by those of ordinary skill in the art.

The embodiment shown in FIG. 1 causes the multi-media control signal to be recorded in the first horizontal line after the start-of-frame signal, but the invention is not so limited. There are typically 20 or so unused lines, and the circuit may include delays or counters to choose a different line or lines in which to embed the multi-media control signals. Also, the horizontal synch signal used to redirect the program signal to the output need not be the first one encountered.

The first frame signal is also used to trigger the control signal's synchronizing circuit 106 which may be required depending on the type of control signal format selected. The control signal format may be as simple as a single pulse, a series of pulses, or a digital signal in a frequency modulated or amplitude modulated format. At the first horizontal sync, the RS latch is reset and normal video resumes.

In the embodiment depicted in FIG. 1, the combined video and control signals are recorded on a recorder 109, such as a video cassette recorder, a video disk, or any other suitable recording medium.

Figure 2:
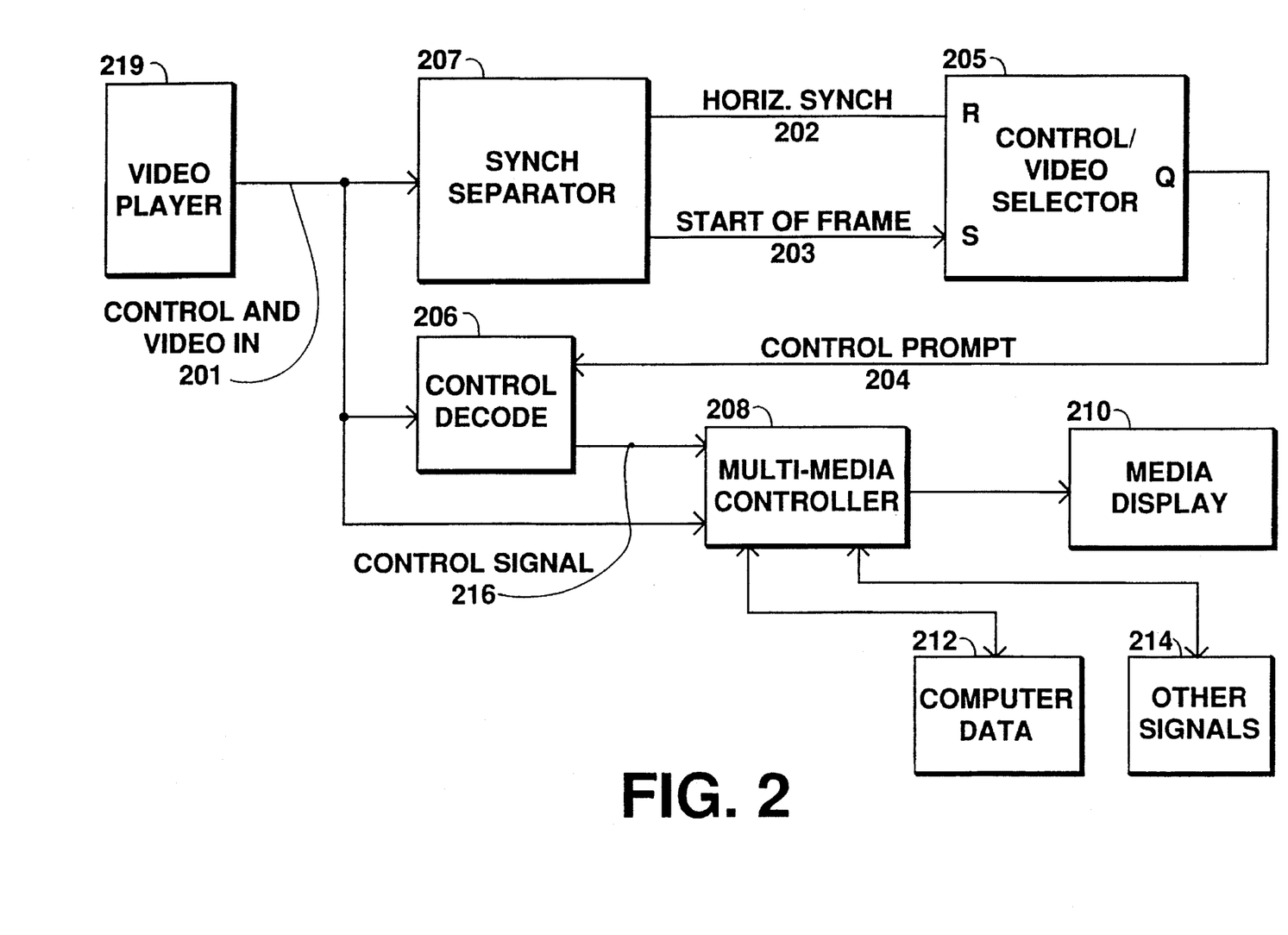
FIG. 2 is a functional block diagram of components for decoding multi-media controller signals from audio/video signals according to the first embodiment.

An almost identical circuit, shown in FIG. 2, may be used to recover the control information. A video signal player 219 is provided playing a recorded video signal with embedded control signals. Of course, the signals need not be taken from a recording, but could be communicated in any suitable video signal transmission fashion. The embedded video program 201 is directed into a sync separator circuit 207 designed to detect the horizontal sync pulse 202 and the start of first frame 203. The start of first frame signal causes RS latch 205 to output a Control Signal Prompt 204 to the Control Signal Decoder 206. The output of the Control Signal Decoder, the decoded embedded control signal 216, is routed to the multi-media controller 208, allowing the controller to synchronize with the pre-recorded video program supplied directly to it. The multi-media controller 208 may also receive inputs from other program sources, such as a computer data source 212 or other signals 214. The controller acts under the direction of the control signal output of the control signal decoder to direct selected (or combined) ones of the program signals to the media display 210, which may be a television or the like.

Audio Encoding

Should the media format include audio, the control information may be contained in an existing subset of the audio frequency band allotted for that media. This requires audio signal filtering to ensure that control signals and standard audio signals do not cross outside their allotted frequency bands. A circuit within the reproduction mechanism is tuned to the control signal band and detects the control signals and passes them on to the reproduction mechanism. The control signal format could be as simple as a single tone, a series of pulsed tones, or a digital signal in a frequency modulated or amplitude modulated format.

Figure 3:
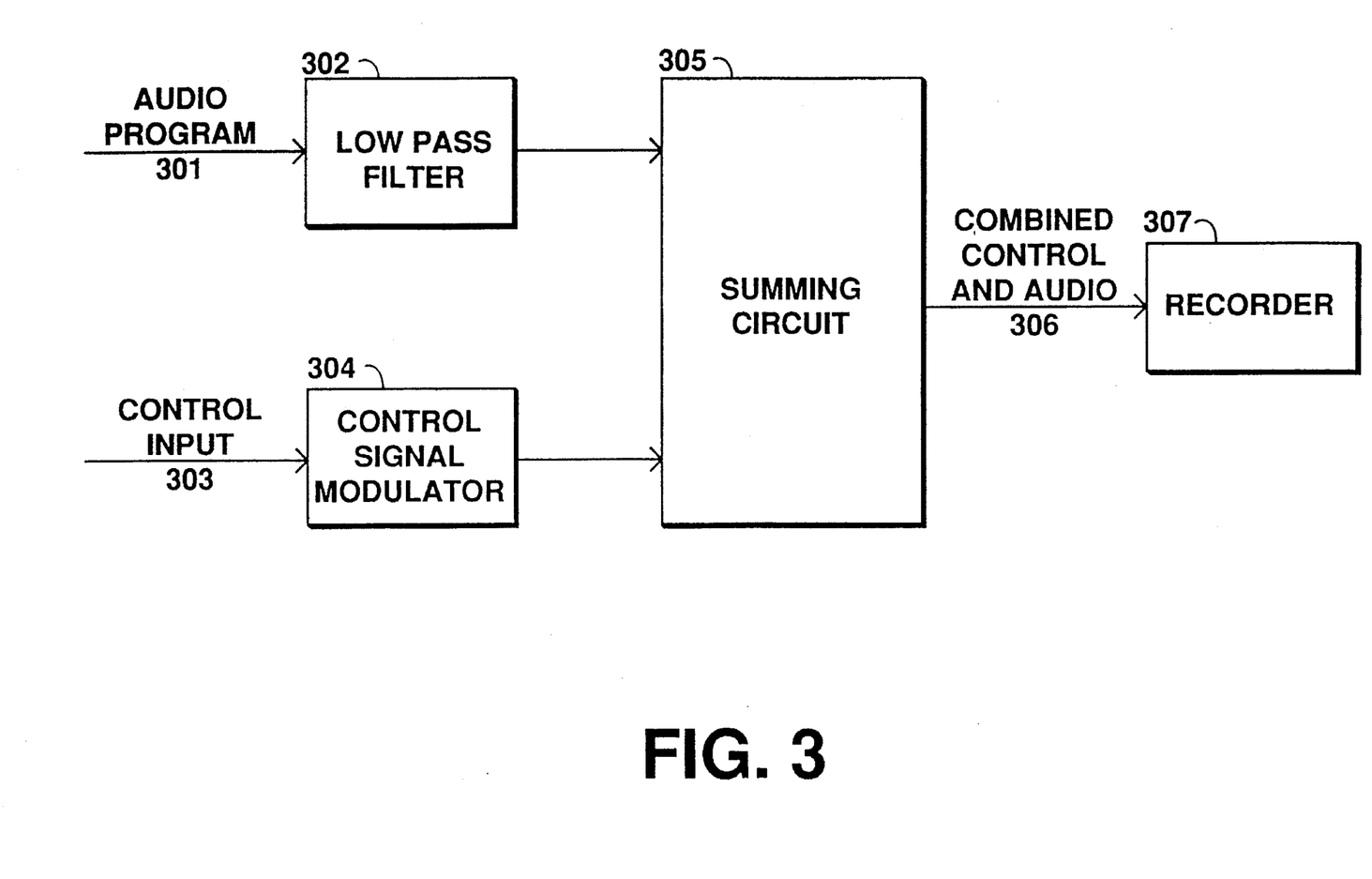
FIG. 3 is a functional block diagram of components for encoding audio/video signals with multi-media controller signals according to a second embodiment.

A block diagram of a circuit to embed the control information into the audio frequency band is shown in FIG. 3. For this example, the control information is embedded in the upper portion of the audio frequency band. The audio program 301 is routed into low pass filter 302 in order to eliminate its high frequency content. The control signal input 303 is modulated into the upper portion of the band by modulator 304, using one of the formats discussed in the previous paragraph. The control information is then added to the low frequency audio by summing the signals in a conventional summing circuit 305. The summed audio program 306 is then passed on to a standard recording mechanism 307.

Figure 4:
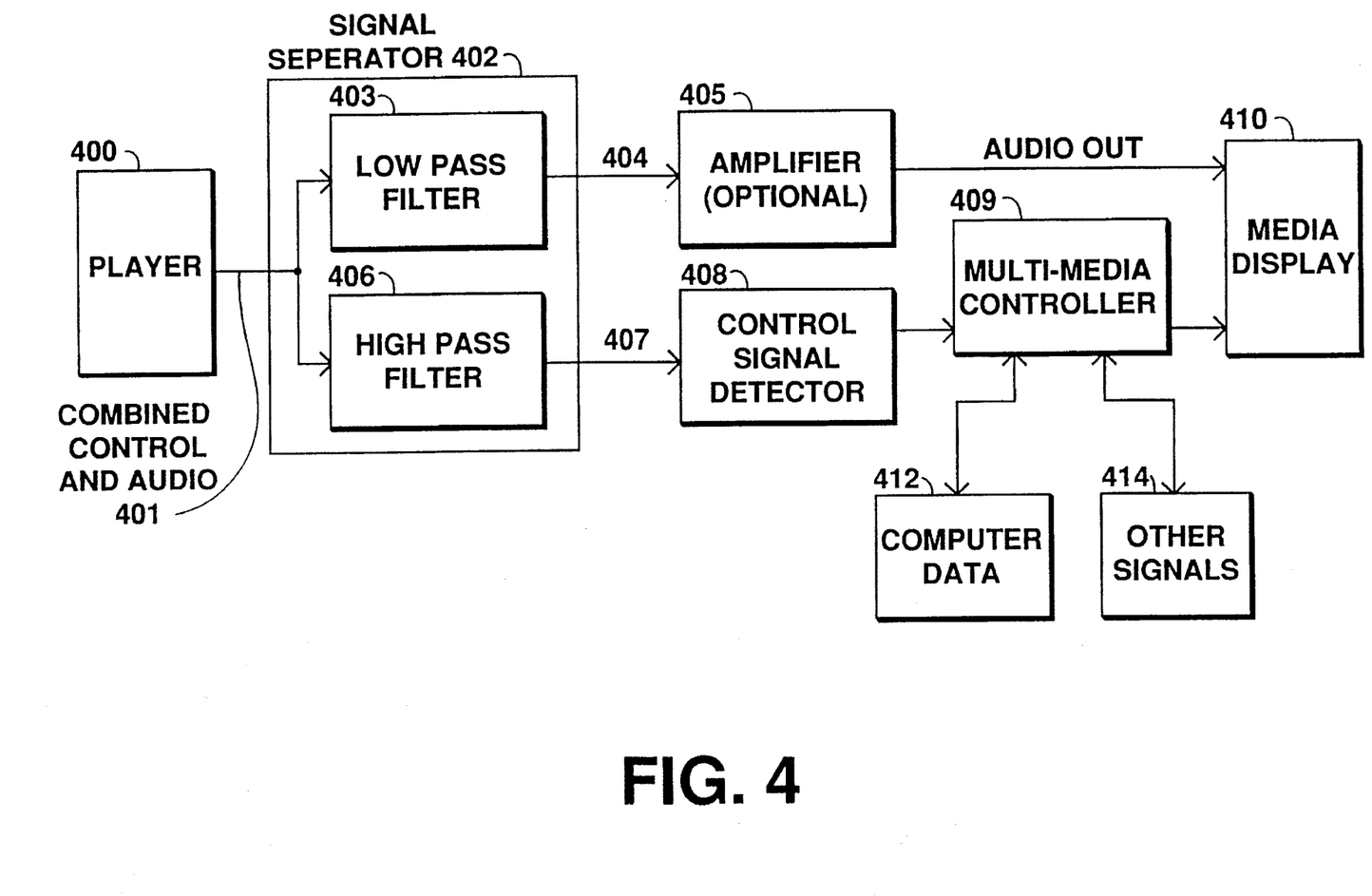
FIG. 4 is a functional block diagram of components for decoding multi-media controller signals from audio/video signals according to the second embodiment.

A block diagram of a circuit for detecting control information embedded in the upper portion of the audio frequency band is shown in FIG. 4. For this example, it is assumed that the audio and video information have already been separated, if required. The embedded audio program 401 is routed from a standard playback mechanism 400 or other video signal source into a signal separator or T 402. Low pass filter 403 then separates the audio program 404 which is routed to a conventional audio amplifier 405, if required.

High pass filter 406 separates the control information 407, which is routed to the control signal detector 408, which detects, demodulates and/or decodes the control information. The decoded information is sent to the multi-media controller 409, allowing the controller to synchronize with the pre-recorded audio program.

The multi-media controller 409 may also receive inputs from other program sources, such as a computer data source 412 or other signals 414. The controller acts under the direction of the control signal output of the control signal detector 408 to direct selected (or combined) ones of the program signals to the media display 410, which may be a television or the like.

This audio encoding method would be required if the normally unused horizontal lines be in use so that the video encoding method is not available, or the particular format not employ raster scanning, such as transparent film projection, or audio only formats.

Because the control information resides in an existing subset of the audio band, the many potential problems are avoided in the merging of the additional information with the program, and later, with the reproduction of the combined program. The control information can be encoded in almost any current art form, such as Frequency Modulation, Amplitude Modulation, and pulse modulation.

A particularly preferred implementation of this invention is in the Graphic Multiline Display System under development by Glibarco, Inc. of Greensboro, N.C., assignee of this application. That product combines computer generated graphics with pre-recorded audio and video information. This invention enhances the quality of the display by adding control information to the audio portion of the recording, thus allowing for the smooth integration of computer graphics with prerecorded audio and video.

The invention is specifically designed to be used in conjunction with the inventions described in Glibarco, Inc.'s copending applications entitled "Video Display Control" of Hans Atchley, Ser. No. 08/271,553, filed on Jul. 7, 1994, a file wrapper continuation of Ser. No. 07/960,515, filed Oct. 13, 1992, and "Multi-media Graphics in Fuel Dispensers" of Russel Dean Leatherman and Walter Baker, Ser. No. 07/960,512, filed Oct. 13, 1992, both filed on even date herewith. The disclosures of those two applications are hereby incorporated herein by reference.

Those of ordinary skill in the art will recognize that the invention as disclosed herein may be implemented in numerous embodiments which differ from the specific disclosure hereof. All such embodiments which fall within the scope of the appended claims are deemed to be within the scope of the patent.

What is claimed is:

1. A fuel dispenser having a controllable video program display comprising:
    a fuel dispensing apparatus including a fuel pump and delivery path,
    a video display,
    a prerecorded program source for providing video program signals and embedded multi-media control signals locating predetermined portions of the program signals,
    a multi-media controller to route said video program signals to said video display,
    an apparatus for recovering said embedded control signals in said prerecorded program comprising:
        a detector for detecting said embedded control signals, and
        a rerouting means for rerouting said embedded control signals to said multi-media controller,
    said multi-media controller being adapted to route said program signals to said video display according to said embedded control signals.

2. A fuel dispenser as claimed in claim 1 wherein said embedded control signals are embedded in a video portion of said prerecorded program source.

3. A fuel dispenser as claimed in claim 2 wherein said prerecorded program source is composite video.

4. A fuel dispenser as claimed in claim 2 wherein said detector further comprises a synchronization separator to detect a start-of-frame signal from said prerecorded program source and said rerouting means includes a gate for routing said embedded control signals to said multi-media controller after the start-of-frame signal is detected.

5. A fuel dispenser as claimed in claim 4 wherein said synchronization separator of said detector further detects horizontal synchronization signals from said prerecorded program source and said gate stops routing said embedded control signals to said multi-media controller when a determined horizontal synchronization signal is detected.

6. A fuel dispenser as claimed in claim 5 wherein said gate stops routing said embedded control signals to said multi-media controller when a first horizontal synchronization signal is detected.

7. A fuel dispenser as claimed in claim 1 wherein said embedded control signals are embedded in an audio portion of said prerecorded program source.

8. A fuel dispenser as claimed in claim 7 wherein said embedded control signals are located in an upper portion of a bandwidth of the audio portion.

9. A fuel dispenser as claimed in claim 8 wherein said detector further comprises a T connection for providing said audio signal with said embedded control signals along a plurality of paths, one said path having a high-pass filter with an output representing said embedded control signals.

10. A fuel dispenser as claimed in claim 9 wherein one of said paths has a low-pass filter for eliminating said embedded control signals prior to being routed to said video display.

11. A method of dispensing fuel comprising:
    pumping fuel along a delivery path in a fuel dispenser,
    recovering embedded multi-media control signals in a prerecorded program, the embedded multi-media control signals locating predetermined portions of the program signals,
    directing video program signals in the prerecorded program to a video display according to the embedded multi-media control signals, and
    displaying the video program signals on a video display associated with the fuel dispenser.

12. A method of dispensing fuel as claimed in claim 11 wherein the recovering step includes recovering control signals embedded in a video portion of the prerecorded program.

13. A method of dispensing fuel as claimed in claim 12 wherein the recovering step includes recovering control signals embedded between a start-of-frame signal in the video program signals and a horizontal synchronization signal in the video program signals.

14. A method of dispensing fuel as claimed in claim 13 wherein the recovering step includes recovering control signals embedded between the start-of-frame signal and a first horizontal synchronization signal.

15. A method of dispensing fuel as claimed in claim 11 wherein the recovering step includes recovering control signals embedded in an audio portion of the prerecorded program.

16. A method of dispensing fuel as claimed in claim 15 wherein the recovering step includes recovering control signals embedded in an upper portion of a bandwidth of the audio portion of the prerecorded program.

17. A method of dispensing fuel as claimed in claim 16 wherein the recovering step includes filtering the embedded control signals from the video program signals.

18. A method of dispensing fuel as claimed in claim 11 wherein the embedded multi-media control signals are other than horizontal or vertical synchronization signals.

19. A fuel dispenser having a controllable video program display comprising:

- a fuel dispensing apparatus including a fuel pump and delivery path,
- a video display,
- a prerecorded program source for providing video program signals having an audio portion with embedded control signals locating predetermined portions of said video program signals,
- a multi-media controller to route said video program signals to said video display,
- an apparatus for recovering said embedded audio control signals in said prerecorded program comprising:
  - a T connection for providing the audio portion along two paths, a first path comprising a high-pass filter having an output representing said embedded control signals and a second path routing the audio portion to an audio output associated with said video display;
  - a detector for detecting said embedded control signals; and
  - a rerouting means for rerouting said embedded control signals to said multi-media controller,
- said multi-media controller being adapted to route said video program signals to said video display according to said embedded audio control signals.

* * * * *